(12) United States Patent
Esser et al.

(10) Patent No.: US 7,600,872 B2
(45) Date of Patent: Oct. 13, 2009

(54) SPECTACLE LENS DEVICE COMPRISING AN ELECTRICALLY ADAPTIVE AREA, SPECTACLES, USE AND METHOD FOR OPERATING SAID SPECTACLE LENS DEVICE

(75) Inventors: Gregor Esser, Munich (DE); Helmut Altheimer, Baisweil-Lauchdorf (DE); Edda Wehner, Emmering (DE); Werner Mueller, Oetisheim (DE); Jochen Brosig, Gruenwald (DE); Dietmar Uttenweiler, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 11/794,056

(22) PCT Filed: Oct. 7, 2005

(86) PCT No.: PCT/EP2005/010833
§ 371 (c)(1),
(2), (4) Date: Jan. 17, 2008

(87) PCT Pub. No.: WO2006/074717
PCT Pub. Date: Jul. 20, 2006

(65) Prior Publication Data
US 2008/0170203 A1  Jul. 17, 2008

(30) Foreign Application Priority Data
Dec. 23, 2004  (DE) ................. 10 2004 062 277

(51) Int. Cl.
*G02C 7/02* (2006.01)

(52) U.S. Cl. ...................... 351/159; 351/209
(58) Field of Classification Search ............... 351/159
See application file for complete search history.

(56) References Cited

U.S. PATENT DOCUMENTS
4,300,818 A  11/1981 Schachar
(Continued)

FOREIGN PATENT DOCUMENTS
DE  197 14 434 A1  10/1998
WO  WO 2005/017572 A2  2/2005

OTHER PUBLICATIONS
International Search Report dated Feb. 7, 2006 (Three (3) pages).
(Continued)

*Primary Examiner*—Jessica T Stultz
(74) *Attorney, Agent, or Firm*—Crowell & Moring LLP

(57) ABSTRACT

The invention relates to a spectacle lens device comprising at least one electrically adaptive area, wherein optical properties of the spectacle lens device can be controlled in an electric manner. The spectacle lens device is configured in such a manner that the optical properties of a predetermined or pre-determinable control area can be controlled in an electrical manner which is essentially independent from the optical properties in a surrounding area. The invention also relates to the control area and to the surrounding area, respectively, about a partial area of the electrically adaptive area. The control area and the surrounding area do not a common area. The invention further relates to a pair of spectacles comprising a spectacle lens device, to the use of the inventive spectacle lens device and also to a method for operating an electrically adaptive area.

18 Claims, 3 Drawing Sheets

U.S. PATENT DOCUMENTS

| | | | |
|---|---|---|---|
| 4,601,545 A | | 7/1986 | Kern |
| 5,114,218 A | * | 5/1992 | Black et al. .................... 351/44 |
| 5,359,444 A | | 10/1994 | Piosenka et al. |
| 6,099,117 A | * | 8/2000 | Gregory ...................... 351/49 |
| 2002/0140899 A1 | | 10/2002 | Blum et al. |

OTHER PUBLICATIONS

International Report on Patentability with English Translation of the Written opinion of the International Searching Authority (Eight (8) pages).

* cited by examiner

SPECTACLE LENS DEVICE COMPRISING AN ELECTRICALLY ADAPTIVE AREA, SPECTACLES, USE AND METHOD FOR OPERATING SAID SPECTACLE LENS DEVICE

BACKGROUND AND SUMMARY OF THE INVENTION

The present invention relates to a spectacle lens device, spectacles, the use of at least one spectacle lens device and a method for operating an electrically adaptive area of at least one spectacle lens.

Spectacle lenses having electrically adaptive elements exist are known. An electrically adaptive element may be, for example, a thin liquid crystalline film, that is mounted on a surface, e.g., the eye-side surface of a spectacle lens. By applying an electric voltage to the liquid crystalline film, the refractive index of the liquid crystalline film may be changed and controlled. If, for example, the liquid crystalline film is disposed on the eye-side surface of a spectacle lens, whereupon the liquid crystalline film covers essentially the entire surface facing the eye, the refractive index of the entire eye-side surface of the spectacle lens may be changed. If, in contrast, the liquid crystalline film is disposed on just a sub-area of the eye-side surface of the spectacle lens, the result is a change in the index of refraction of the liquid crystalline film [in a change in the index of refraction] in the sub-area of the eye-side surface of the spectacle lens, on which the liquid crystalline film is disposed.

However, such known devices enable only small variations in the refractive index, a feature that does not make it possible, for example, to achieve the necessary refractive indices for presbyopia. In order to achieve greater variations in the refractive index, one can, among other things, increase the thickness of the liquid crystalline layer. This approach, however, has a negative impact on optical phenomenon and, in particular, the translucency of spectacles and necessitates the use of high electrical voltages for scattering the variations in the refraction index of the liquid crystalline layer. Furthermore, thick liquid crystalline layers exhibit very slow reaction times.

As an alternative, for example, the prior art teaches that liquid crystals may be combined with Fresnel lenses in order to reduce the thickness of the liquid crystal layers. Disturbing edge artifacts between the neighboring effective edges, however, reduce the image quality.

Therefore, an object of the invention is to provide a spectacle lens device having an electrically adaptive element with improved optical performances. Another object of the present invention is to provide suitable spectacles as well as a use for the corresponding spectacle lens device and a method for operating an electrically adaptive area.

These objects have been achieved with a spectacle lens device having

- the spectacle lens device configured in such a manner that the optical properties in a predetermined or predeterminable control area can be electrically controlled essentially independently of the optical properties in a surrounding area;
- the control area and the surrounding area that are sub-areas of the electrically adaptive area; and
- the control area and the surrounding area that do not exhibit any common areas, as well as a method for operating an electrically adaptive area.

Therefore, it will be understood that the electrically adaptive area comprises two separate areas, namely the control area and the surrounding area. The surrounding area is, essentially, the electrically adaptive area without the control area. Preferably the spectacle lens device is configured such that a sub-area of the electrically adaptive area, which is called the control area, can be selected for the purpose of an electric actuation. The electric actuation may be carried out by an electrical current and/or electrical voltage in order to control the optical properties of the control area. In particular, the optical properties of the surrounding area, i.e., the remaining electrically adaptive area, are essentially independent of the change in the optical properties in the control area.

Therefore, it is not the optical properties, such as the optical refractive index, of the entire electrically adaptive area, but only the optical properties of the control area that are controlled by the spectacle lens device according to the present invention. Consequently, a maximum change in the index of refraction may be achieved in the control area, i.e., in a sub-area of the electrically adaptive area. In conventional devices, this change is achieved only over the entire electrically adaptive area. Therefore, in contrast to the prior art, a comparable change in the index of refraction may be achieved in an advantageous manner over a smaller surface, i.e., the surface of the control area. Hence, a larger optical effect (e.g., refracting power) can be produced in the control area, as compared to the optical effect in conventional devices, that distribute the maximum change in the index of refraction or the available refractive index variation over the entire electrically adaptive area.

Preferably the electrically adaptive area has a thin liquid crystalline layer. By applying an electric voltage, one can change the refractive index of the liquid crystal. At the same time the change in the refraction index is limited due to the properties of the material of the liquid crystal and/or due to the voltage that is applied. Consequently with a predetermined electric voltage that is applied to the electrically adaptive area, a defined increase in the effect can be achieved over the area of the electrically adaptive element. If, however, the same voltage is applied to a preferably small sub-area of the electrically adaptive area, namely, the control area, one can achieve the same increase in the refraction index over a smaller three dimensional elongation, thus achieving a greater optical effect than is possible over the entire electrically adaptive area.

Preferably the spectacle lens device also comprises a control unit, according to a currently preferred configuration of the present invention, which the predetermined or predeterminable control area of the electrically adaptive area can be specifically selected and/or actuated. In other words, the use of the control unit allows an electric voltage or rather an electric current to be applied such that the optical properties in the control area can be controlled. In particular, with the use of the control unit the position and/or the size of the control area can be defined and/or controlled. Preferably with the use of the control unit the optical properties of the control area can be controlled, for example, by varying the electric voltage and/or the electric current that is applied. At the same time the optical properties of the surrounding area remain essentially unaffected.

Preferably the position, the size and/or the optical properties of the control area can be changed and/or controlled in time. That is the period, in which the position, the size and/or the optical properties of the control area can be changed and/or controlled, is in the microsecond to millisecond range. In particular, the position, the size, and/or the optical properties of the control area can be quickly changed and/or controlled in such a manner that, for example, the position of the control area can be adapted to the position of a visual point. In the context of the invention the visual point is an intersecting point of a line of sight and/or the fixation line with the eye-side surface of the spectacle lens device, according to the DIN EN ISO 13666:1998 definition. With respect to other technical terms, reference is made to the pertinent standards, in particular DIN EN ISO 13666:1998. Furthermore, with respect to the technical terms that are used reference, is made to Heinz Dieps' and Ralf Bendowske's book *Optik und Technik der Brille [Optics and the Technology of Spectacles]*, published in 2002 by Optische Fachveröffentlichung GmbH, Heidelberg, and insofar as an integral component of the invention is shown.

It is also now possible for an optician to adjust the spectacle lens device to a spectacle wearer. Thus, for example, the optical properties of the spectacle lens device are adjusted to the values in the wearer's prescription. When the visual acuity deteriorates, for example, over a period of months or years, an optician can compensate for this deterioration of the visual acuity by changing the optical properties of the spectacle lens device. That is, over a period of months and/or years, an optician will change, preferably at regular intervals, the optical properties of the spectacle lens device to the changed defects of the user's vision.

Furthermore, the optician can adjust just once the spectacle lens device to the requirements of the user of the spectacle lens device, thus, performing, for example, an irreversible process. In particular, the optical properties of the control area can be permanently altered. For example, the spectacle lens device is made with predetermined optical properties and, upon being sold, adjusted once by the optician to match the values in the user's prescription, a feature that also is changeable over time.

Preferably the electrically adaptive area is disposed on an eye-side surface, on a lens-side surface and/or between the surface facing the eye and the surface facing the lens. In an especially preferred configuration the electrically adaptive area is configured substantially in a planar manner.

Furthermore, the spectacle lens device preferably comprises an eye tracking device that is configured to find an eye's line of sight by detecting the position and/or movement of the eye. Hence, a visual point may be determined by the spectacle lens device or rather the eye tracking device. In this respect the visual point corresponds to an intersecting point of the line of sight and the eye-side surface of the electrically adaptive area. Preferably the position of the control area can be controlled so that the control area comprises the visual point. In an especially preferred configuration the geometric center point of the control area is located essentially at the position of the visual point.

The geometric center point of the control area is the point that corresponds to the control area's center of mass, with the exception that the control area is substantially planar (that is, substantially two dimensional); and the control area exhibits an essentially constant density. The vector GSP of the geometric center point can be calculated using the surface integral over the surface of the control area:

$$GSP = \int_{surface} r\rho \, dF,$$

where, in particular, $\rho$ is a constant density by unit area of the control area, where dF is a surface element, and r is a position vector of the surface of the control area. Consequently the geometric center point can be calculated analogously to the center of mass where instead of a constant mass/volume/density, a constant mass/area/density is used, and a unit mass is assumed to be the mass of the control area.

Advantageously, in a preferred configuration of the spectacle lens device of the present invention, the user's gaze direction can be determined essentially at any time. Essentially, the optical properties of the control area at essentially the visual point of the spectacle lens device are adapted essentially to the values of the user's prescription. Therefore, it is unnecessary to adapt the optical properties of the entire electrically adaptive area to the values of the user's prescription. Rather, it is only necessary to adapt the optical properties to the values in the prescription in a small sub-area of the electrically adaptive area, i.e., the control area. Since the optical properties are adapted only in the control area, the adaptation of the optical properties is advantageously very flexible. For example, a high optical effect can be achieved due to the small surface of the control area. The spectacle lens device is preferably configured so that the position of the control area may be adjusted very quickly to the visual point. Therefore, the optical properties of the control area may be adapted in the period of time that the eye moves. Consequently the user does not perceive essentially the adaptation and/or control of the optical properties. In particular, the user's perception would be essentially the same if the optical properties were adapted over the entire electrically adaptive area.

The spectacle lens device of the present invention permits the imaging errors of the wearer's eye to be corrected, thus producing a correction effect in the control area. The spectacle lens device can, however, also exhibit defined optical properties that are changed in the control area. For example, an already existing refractive index of the spectacle lens device can be increased in the control area. Imaging errors in the spectacle lens of the spectacle lens device can, however, also be advantageously compensated. Thus, for example, during the manufacturing process of the spectacle lens device and/or the spectacle lens of the spectacle lens device, larger error tolerances are permitted, because they can be compensated for essentially by the electronics in the control area.

Preferably the position, the size and/or the optical properties of the control area can be regulated and/or controlled by at least one electrically conductive electrode. In an especially preferred configuration the spectacle lens device comprises a plurality of electrically conductive electrodes disposed preferably in and/or on the electrically adaptive area. Preferably the electrically adaptive area does not completely cover the eye-side surface and/or the lens-side surface of the spectacle lens device and/or the spectacle lens of the spectacle lens device. Preferably, however, a plurality of electrically conductive electrodes is arranged at preferably regular intervals and cover essentially the entire eye-side surface and/or a lens-side surface of the spectacle lens device and/or the spectacle lens of the spectacle lens device.

Preferably the control area of the electrically adaptive area is essentially circular. In an especially preferred configuration the control area has an area ranging from 10 mm$^2$ to 100 mm$^2$, in particular ranging from about 35 mm$^2$ to 55 mm$^2$.

Preferably the control area ranges from about 0.2% to about 3.6%, especially preferred from about 0.7% to about 2.0% of the total area of the electrically adaptive area, in a standard spectacle lens that exhibits a diameter ranging from about 60 mm to about 80 mm. The control area's share of the total area of the electrically adaptive area decreases as the total area of the electrically adaptive area increases.

Preferably the size of the control area is chosen such that the control area comprises essentially an area and/or a surface of the spectacle lens device or rather the spectacle lens of the spectacle lens device that is pierced by the aperture ray path of the user's eye for direct vision. For example, the aperture ray path exhibits an essentially conical shape.

Preferably the control unit is configured to control the control area so that, in a standardized operating position of the spectacle lens device, a projection of the control area on the surface of the vertex sphere exhibits essentially an area ranging from about 10 mm$^2$ to 100 mm$^2$, in particular ranging from 35 mm$^2$ to 55 mm$^2$, where the vertex sphere is a sphere, the center point of which coincides with the eye's point of rotation and the radius of which is equal to the distance of the eye's point of rotation from the vertex in a standardized operating position of the spectacle lens device.

A standardized operating position of the spectacle lens device is a position in which the distance between the eye's point of rotation and the vertex of the spectacle lens is about 28.5 mm at a cornea vertex distance of about 15 mm. The forward tilt of the spectacle lens or rather the spectacle lens device is about 8 deg.; the frame's angle of inclination is about 0 deg. Furthermore, a standardized spectacle wearer with a standardized pupil distance of about 63 mm is assumed.

Preferably the control area of the electrically adaptive area exhibits diffractive optical properties. For example, in the control area an amplitude grating can be produced dynamically by local structures that correspond to periodically alternating areas of maximum transmission and non-permeable grating points or rather grating surfaces. As an alternative, it is possible, for example, a locally adaptive phase grating can be produced in which a phase modulation of the transmitted wave is achieved by a local change in refraction index so that structural interference in the first order diffraction maximum results in a diffractive deflection of the ray. Preferably the local diffractive structure comprises essentially concentric rings so that the essentially rotationally symmetrical distribution of refractive power produces an essentially constant transition to an inherent effect of the spectacle lens device.

In an especially preferred configuration the control area of the electrically adaptive area exhibits essentially the properties of a gradient lens. Therefore, the refraction index can increase or decrease radially outwards preferably from the visual point and/or from the geometric center point, i.e., essentially the middle of the control area. Thus, the index of refraction is a function of the radial distance from the geometric center point and/or center point of the control area.

Furthermore, the spectacle lens device comprises preferably a plurality of electrically adaptive element cells. Therefore, the control area of the electrically adaptive area comprises at least one electrically adaptive element cell, in an especially preferred design, a plurality of electrically adaptive element cells. For example, the electrically adaptive area can comprise an essentially flat layer of a liquid crystal or rather can be made essentially of an essentially flat layer of a liquid crystal. For example, an electrode grating is arranged on the essentially flat liquid crystal. Then an element cell corresponds essentially to a three dimensional area of the liquid crystal, in which a predetermined index of refraction can be achieved by applying an electric voltage to the electrode grating. In particular, an electrically adaptive element cell is is the smallest unit of area that can be actuated by the electrode grating (that is, the smallest unit of area, in which a predefined optical refractive index can be achieved).

As an alternative only a small number of electrodes may be disposed on and/or in the liquid crystal and a voltage to the electrodes so that an essentially continuous distribution of the refraction index of the liquid crystal is achieved in the control area.

As a further alternative, the electrically adaptive area can comprise a plurality of electrically adaptive element cells. Each electrically adaptive element cell forms essentially a defined unit. Each of the electrically adaptive element cells may be, for example, an essentially independent electrowetting cell, i.e., a cell based on the so-called electrowetting principle. Hence, each of the electrically adaptive element cells is supplied with voltage by an electrode. Each of the electrically adaptive element cells, operating on the electrowetting principle, comprises, for example, two essentially transparent liquids having different refractive indices and identical densities; yet one of the liquids is non-polar and the other is polar. By applying a voltage to the electrowetting cell a micro-lens can be produced due to the form of the two immiscible liquids. The size of such a cell, based on the electrowetting principle, can be equal essentially to the size of the control area. The control area can also comprise a plurality of such lenses. Therefore, the optical properties of the control area are changed by controlling and/or applying the voltages to the cells based on the electrowetting principle.

In an especially preferred configuration, the electrically adaptive element cells are embedded in the spectacle lens device.

Furthermore, in an especially preferred configuration, the electrically adaptive element cells are disposed on a surface of the spectacle lens device.

Also, in an especially preferred configuration, the electrically adaptive element cells are arranged essentially uniformly so that the spectacle lens (device especially preferred is the spectacle lens of the spectacle lens device) is essentially totally covered by the electrically adaptive element cells. In other words, each visual point is located in an electrically adaptive element cell, so that there is essentially no free space between the element cells.

Furthermore, the present invention relates to spectacles with at least one spectacle lens device according to the present invention.

Furthermore, the present invention relates to the use in spectacles of at least one spectacle lens device according to the present invention. Hence, the optical properties of the control area of the electrically adaptive area are adapted to the individual data of a spectacle wearer.

Preferably a position and/or a size of the control area can be adapted to conform with a gaze direction, i.e., to conform with a visual point of the user of the spectacle lens device. Therefore, in the control area, which comprises essentially the visual point, the optical properties of the spectacle lens device are adapted likewise essentially to the values of the prescription of the spectacle wearer. Furthermore, the position of the control area can be advantageously changed essentially in the period of time in which the visual point is changed by changing the gaze direction. In other words, the position of the control area moves essentially simultaneously with the position of the visual point.

Furthermore, the present invention relates to a method for operating at least one electrically adaptive area of at least one inventive spectacle lens device, with the steps:

providing at least one spectacle lens device;

controlling the control area of at least one electrically adaptive area such that the optical properties of the control area match essentially the values in the prescription of the spectacle wearer.

Preferably the optical properties of the control area of the electrically adaptive area are adjusted, according to the inventive method, to match the individual data of a spectacle wearer.

Preferably the inventive method comprises the following additional steps:

detecting a line of sight by via an eye tracking system;
determining a visual point which is the intersecting point of the line of sight with the eye-side surface of the electrically adaptive area; and
positioning the control area such that the control area comprises essentially the position of the visual point.

Other objects, advantages and novel features of the present invention will become apparent from the following detailed description of the invention when considered in conjunction with the accompanying drawings.

DETAILED DESCRIPTION OF THE DRAWINGS

Figure 1:
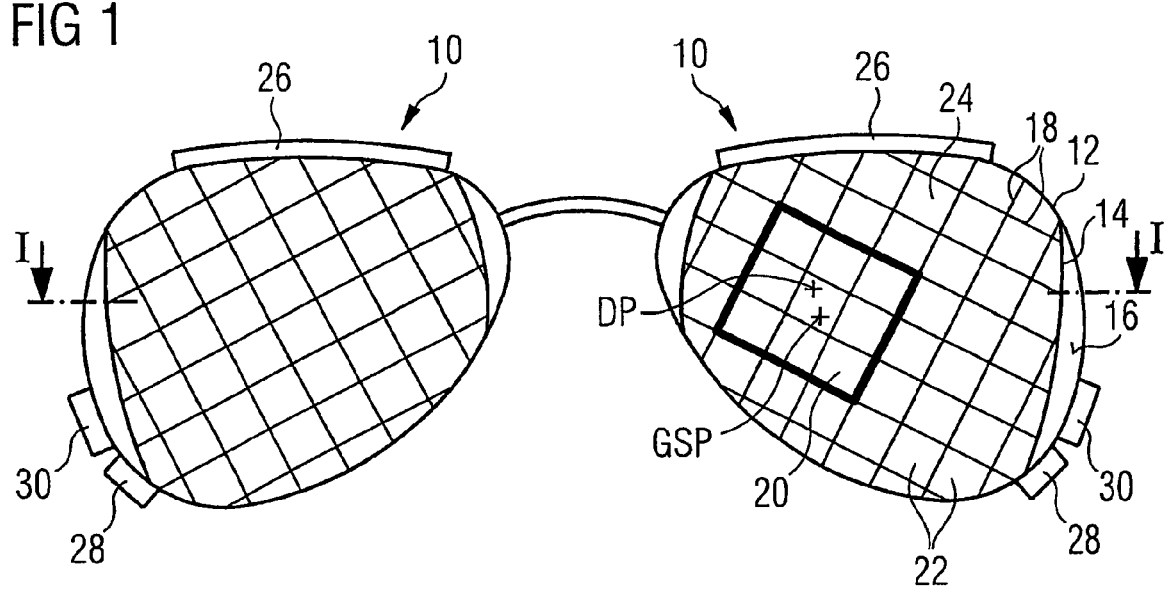
FIG. 1 is a front view of a current preferred spectacle configuration having a spectacle lens device according to the present invention.

FIG. 1 shows spectacles 1, having a spectacle lens device designated generally by numeral 10 according to a currently preferred configuration of the present invention. The spectacle lens device 10 includes a conventional spectacle lens 12 with an electrically adaptive area 14. The electrically adaptive area 14 is produced, for example, by applying a thin layer of a liquid crystal on an eye-side surface 16 of the spectacle lens 12. Furthermore, the electrically adaptive area 14 comprises an electrode grating that has a plurality of electrodes 18. Furthermore, FIG. 1 depicts a control area 20 bounded by bold lines. The control area 20 represents a sub-area of the electrically adaptive area 14. Hence, in this preferred configuration the control area 20 comprises preferably nine electrically adaptive element cells 22. Furthermore, FIG. 1 depicts the geometric center point GSP of the control area 20 that coincides essentially with a visual point DP. The remaining area of the electrically adaptive area 14 is the surrounding area 24.

Furthermore, the preferred spectacle lens device 10 comprises an eye tracking system 26 that is configured to detect a gaze direction of the eye (not illustrated) and to determine the visual point DP from the gaze direction. A control unit 28 is configured essentially to provide from the plurality of electrically adaptive element cells 22 of the electrically adaptive area 14 preferably those electrically adaptive element cells 22 with electric current or rather electric voltage that are enveloped essentially by the control area 20. In the present configuration, the control area 20 comprises, for example, nine electrically adaptive element cells 22. The control unit 28 supplies essentially those electrically adaptive element cells 22 with electrical voltage and/or electric current from a battery 30 via the electrodes 18 that are essentially adjacent to the electrically adaptive element cell 22 that comprises the is visual point DP. Preferably the electrically adaptive element cells 22 of the preferred design of the present invention exhibit an essentially square cross section. Therefore, the control area 20 also exhibits an essentially square cross section. Thus, the electrically adaptive element cell 22 comprises the visual point DP in the center of the control area 20.

Figure 2:
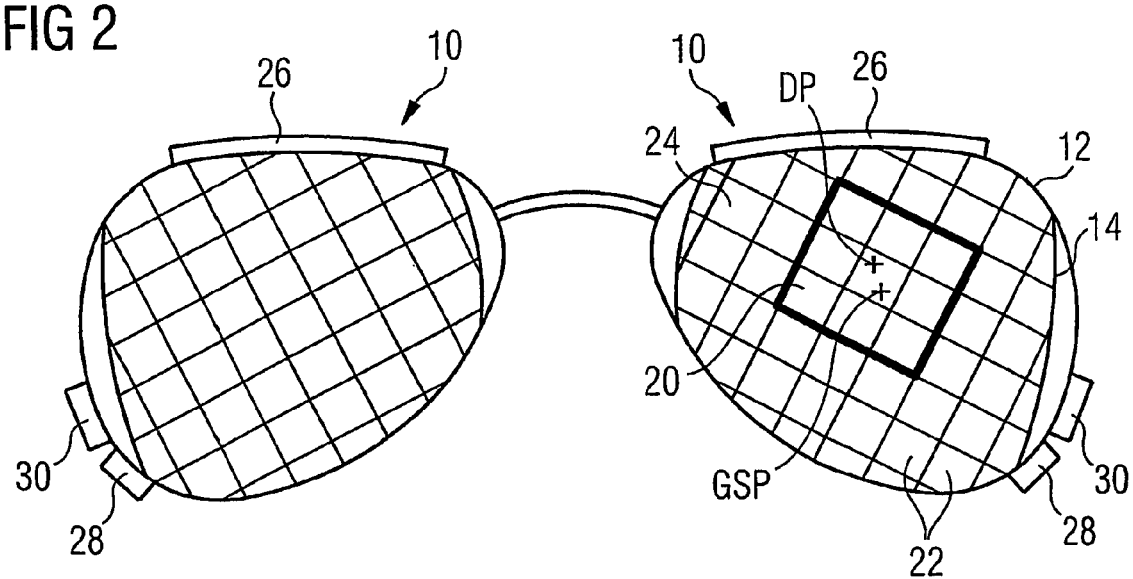
FIG. 2 is a schematic view of a spectacle lens device shown in FIG. 1.

FIG. 2 depicts the spectacle lens device 10 of FIG. 1, but where the position of the visual point DP has changed from that shown in FIG. 1. In conformity with the modified position of the visual point DP, the position of the control area 20 was also modified. Again the control area 20 comprises nine electrically adaptive element cells 22 (within the bold lines) that are configured as a square. The central element cell 22, i.e., the element cell 22, which is disposed essentially at the geometric center point GSP of the control area 20, comprises the visual point DP. The visual point DP and the geometric center point GSP of the control area 20 are essentially the same.

Preferably the control area 20 forms an electrically adaptive gradient lens. The refraction index increases or decreases radially outwards from the center, i.e., essentially from the geometric center point GSP. In this respect the index of refraction n is a function of the radial distance r from the geometric center point GSP. For example, this function can be chosen as follows.

$$n(r) = \sum_i a_i \cdot r^i$$

It is preferred that, if $a_0$ is approximately equal to the refraction index of the spectacle lens 12 (i.e., $a_0 \approx n_G$), $a_1$ should be as small as possible. Preferably $|a_1| \leq 10$ is true; and $a_2$ should move in the following range, $$a_2 \leq \frac{(X+D)}{d_M}, \text{ where:}$$

$n_G$=the index of refraction of the spectacle lens 12,

Z=the additional effect, $d_M$=the thickness of the liquid crystal layer, and

D=the effect of the spectacle lens 12 and where $a_2$ is usually negative.

The additional effect Z, for example, of a liquid crystal layer of the control area 20 is generally calculated as an approximation according to the equation:

$$Z \approx D_{2Z} + \frac{D_{1Z}}{1 - \frac{d_M}{a_0}D_{1Z}} - \frac{2a_2 d_M}{1 - \frac{d_M}{a_0}D_{1Z}} = D_{2Z} + D_{1Z}Ne - 2a_2 d_M Ne, \text{ and}$$

$D_1Z$=the refracting value of the front surface of the control area 20, $D_2Z$=the refracting value of the rear surface of the control area, $d_m$=the center thickness of the control area 20, and $N_e$=the self-enlargement of the control area 20.

If the control area 20 exhibits preferably a layer of liquid crystal having a layer thickness $d_m \approx 20$ μm and a diameter of about 4 mm; and if the maximum refractive index change is $\Delta n \approx 0.25$, then the result is approximately an additional effect of $Z \approx 2.5$ dpt.

In order to produce the additional effect, $a_0$ need not coincide with the refractive index $n_G$ of the spectacle lens 12, but rather can be chosen essentially at random. If the additional effect $a_0$ is approximately equal to the refractive index $n_G$ of the spectacle lens 10, there are no disturbing flares, which can develop when the difference between $a_0$ and the refractive index $n_G$ of the spectacle lens 12 is large. Therefore, it holds preferably: $a_1 \approx 0$ and $$a_1 \approx 0 \text{ and } a_2 \approx \frac{-z}{2 \cdot d_M}.$$

In particular, it holds preferably:

$$a_1 = 0 \text{ and } a_2 = \frac{-Z}{2 \cdot d_M}$$

Advantageously the higher order imaging errors can also be corrected. In conventional spectacle lenses, this is only conditionally possible, since each visual point must already exhibit a specific refractive index for the gazing eye. Therefore, there are no degrees of freedom in order to correct, for example, coma and/or spherical aberrations. With the present invention, not only the defective vision of a spectacle wearer can be corrected essentially at the visual site or rather at the visual point DP, but advantageously also the optical errors of the spectacle lens 12 at the visual point DP and/or the optical properties of the spectacle lens 12 can be varied at the visual point.

Imaging errors of higher order can be calculated, for example, by the following processes.

Specify the gaze direction, the lens point and/or a point on the front or rear surface of the spectacle lens. With the aid of these points and the eye's point of rotation 36 (FIG. 4) a ray path is clearly defined; and by calculating the rays a principal ray HS (FIG. 4) can be calculated.

Figure 4:
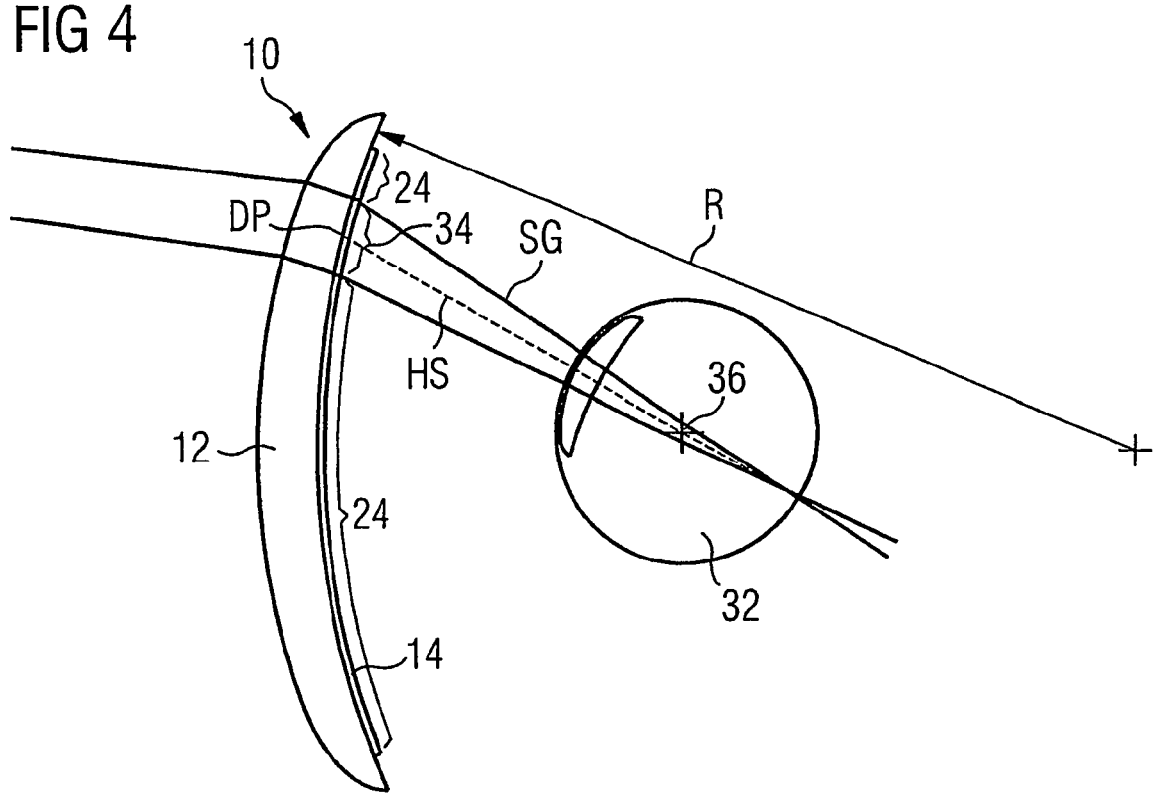
FIG. 4 is a sectional view along line I-I of FIG. 1 with a conventional curvature of the spectacle lens device.

Calculate a position of an aperture stop by rotating an entrance pupil of the eye 32 (FIG. 4) as a function of the gaze direction and the eye's point of rotation 36 (FIG. 4). The center of the aperture stop is located on the principal ray HS (FIG. 4). Consequently the result is a new position of the aperture stop for each gaze direction.

Calculate the aperture ray path SG (FIG. 4), by calculating the rays, starting from an object (not illustrated) having varying aperture angles.

Calculate a wavefront in the entrance pupil from the said rays and the corresponding lengths of the optical paths.

Represent the wavefront by way of Zernike polynomials.

Calculate the imaging errors by way of the coefficients of the Zernike polynomials, where the result is the astigmatism, refractive index, coma and/or spherical aberrations, etc. for each gaze direction.

In order to correct the higher order imaging errors, the coefficients $a_i$, where $i>2$, can be used. Both the higher order imaging errors that are produced by the spectacle lens 12 and those imaging errors that the eye 32 itself exhibits can be corrected. In this way a vision of 2.0 or higher can be produced in an advantageous way.

Furthermore, the refractive index profile, i.e., the refractive index distribution of the adaptive area, can be controlled as a function of the distance from the visual point DP and/or from the geometric center point GSP so that the refractive index of the surrounding area 24 is equivalent essentially to the refractive index of the spectacle lens 12, and there is an essentially sudden (i.e., not continuous) transition of the refractive index from the control area 20 to the surrounding area 24. Consequently the effect and, thus, the image that is seen has a jump. This image jump exists in bifocal lenses and is not a problem.

However, the refractive index transition from the control area 20 to the surrounding area 24 can run in an essentially constant manner. Thus, there is advantageously no image jump.

A correction of the astigmatism can also be carried out, if desired, by the control area 20 of the electrically adaptive area 14.

Furthermore, the spectacle lens 12 may exhibit only simple spherical or aspherical surfaces; and imaging errors and/or visual acuity errors of the user of the spectacle lens 12 or rather the spectacle lens device 10 can be carried out by the control area 20 of the electrically adaptive area 14. The course of the gradient of the refractive index n looks preferably as follows:

$$n(u, v) = \sum_{i,j=0}^{n} a_{ij} u^i v^j$$

where u=the distance from the visual point DP in the direction of a spherical effect.

v=the distance from the visual point DP in the direction of an astigmatic effect.

Thus, the following approximation equations for the first expansion elements of the power series hold true in a manner analogous to the radial refractive index function, as described above:

$a_{10} \approx a_{01} \approx 0$ and $$a_{02} \approx \frac{Z_{sph} + Z_{cyl}}{2d_M} \text{ and } a_{20} \approx \frac{Z_{sph}}{2d_M}.$$

Preferably it holds:

$a_{10} = a_{01} = 0$ and $$a_{02} \approx -\frac{Z_{sph} + Z_{cyl}}{2d_M} \text{ and } a_{20} \approx -\frac{Z_{sph}}{2d_M}.$$

Higher elements of the power series have essentially no effect on the optical effect in the center of the control area 20 and can be used to correct the remaining imaging errors.

In order to produce an additional effect, $a_0$ and/or $a_{00}$ need not coincide with the refractive index $n_G$ of the spectacle lens 12, but rather can be chosen at random. If the difference of $n_G - a_0$ is a large value, however disturbing flares could ultimately develop.

Figure 3:
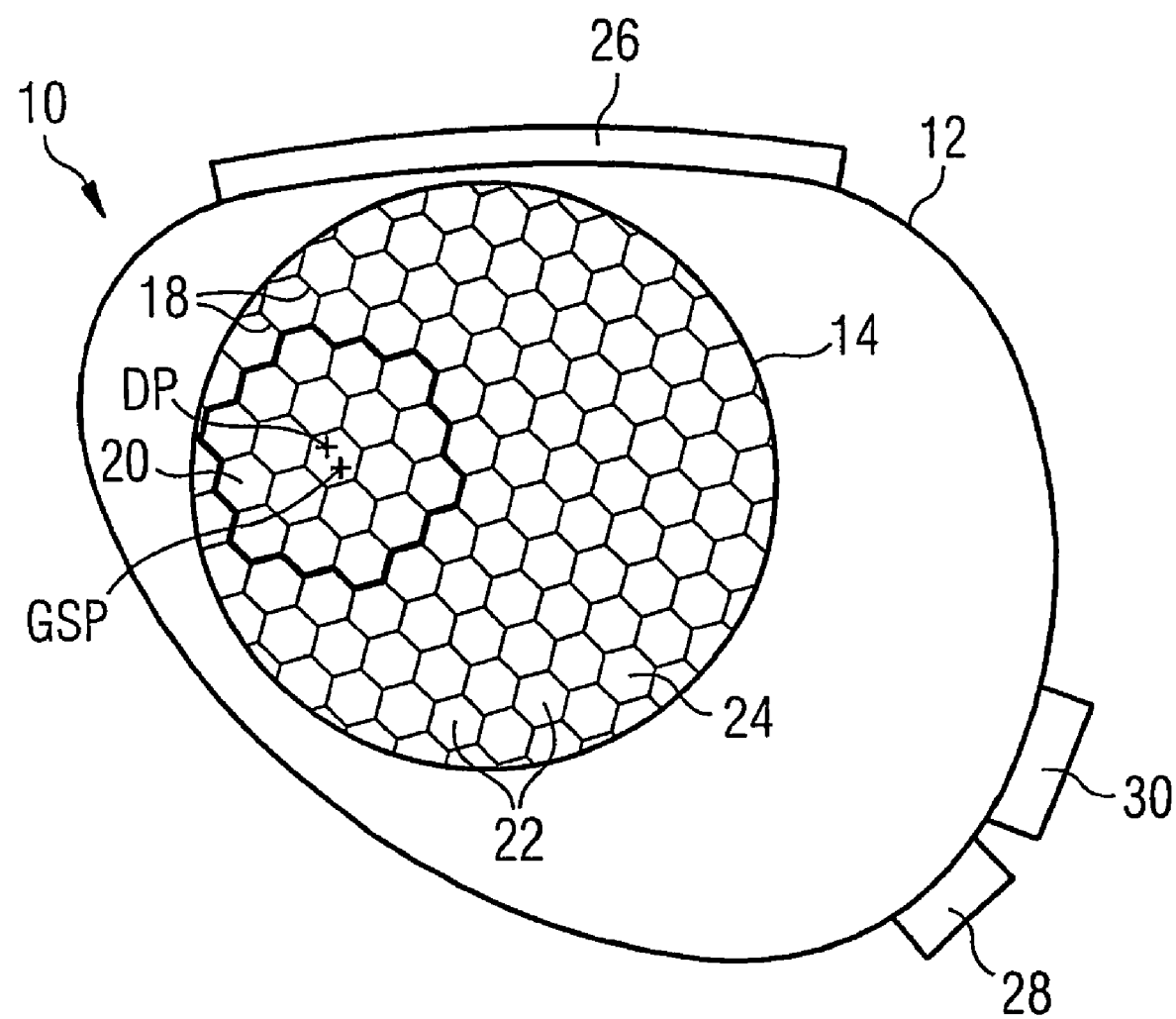
FIG. 3 is depicts a front enlarged view of a preferred embodiment of the control area, shown in FIG. 1.

Furthermore, the electrically adaptive element cells 22 must not exhibit an essentially square cross section. Rather the electrically adaptive element cells 22 can exhibit, for example, a hexagonal cross section, as shown in the schematic drawing in FIG. 3. The electrically adaptive area 14 comprises preferably a plurality of electrically adaptive element cells 22 arranged uniformly, i.e., essentially without any space between the individual electrically adaptive element cells 22, in and/or on the electrically adaptive area 14. In the control area 20 of the electrically adaptive area 14, only a defined number, for example, nineteen electrically adaptive element cells 22 are supplied by the control unit 28 with electric voltage or rather electric current. Preferably eighteen electrically adaptive element cells 22 are arranged essentially symmetrically around a central electrically adaptive element cell 22. The central electrically adaptive element cell 22 includes the visual point DP. Therefore, the control area 20 of the electrically adaptive area 14 has an essentially circular cross section.

Instead of a liquid crystal film and an electrode grating, the electrically adaptive area 14 can also exhibit a plurality of electrically adaptive element cells 22. Each electrically adaptive element cell 22 works on the electrowetting principle.

FIG. 4 is a sectional view of the preferred configuration of the spectacle lens device 10 according to FIG. 1, along the line I-I. Furthermore, FIG. 4 schematically shows an eye 32 with the aperture ray path SG drawn in. The aperture is ray path SG intersects the spectacle lens 12 and/or the electrically adaptive area 14 in a visual area 34. The visual area 34 conforms essentially with the control area 20. The visual point DP coincides essentially with the geometric center point GSP of the electrically adaptive area 14. Furthermore, FIG. 4 shows the surrounding area 24 of the electrically adaptive area 14, that is essentially the area of the electrically adaptive area 14, not comprised by the control area 20.

Figure 5:
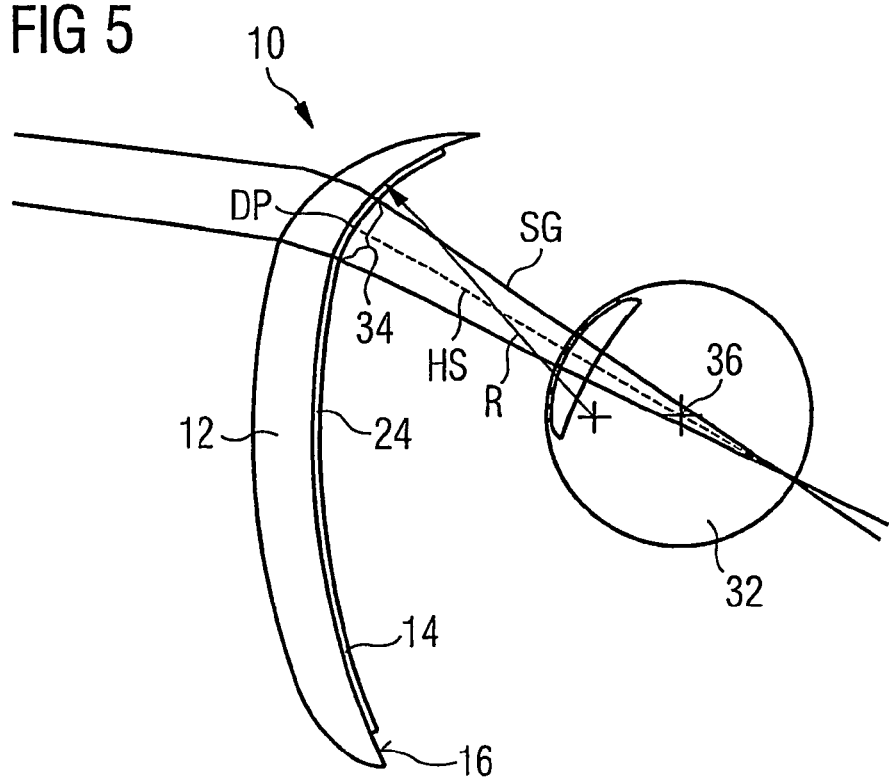
FIG. 5 is a sectional view along line I-I of FIG. 1 but with a large curvature of the spectacle lens device.

When the aperture ray path SG is essentially the same and/or essentially constant, the surface of the control area 20 is a function of a radius of curvature R of the eye-side surface 16 of the spectacle lens 12. This is especially important for so-called sports spectacles where, in particular, the rim region of the spectacle lens 12 may exhibit a smaller radius of curvature R as shown, for example, in FIG. 5. Thus, the surface of the visual area 34, compared to conventional spectacle lenses 12, is reduced, as shown, for example, in FIG. 4. Consequently the control area 20 of the electrically adaptive area 14 is also reduced because the control area corresponds essentially to the visual area 34. In particular, the control area 20 is adapted essentially to the visual area 34. Therefore, FIGS. 4 and 5 illustrate only the visual area 34, but not the control area 20. The size of the control area 20 and, therefore, also the size of the visual area 34 correspond essentially to the interface of the spectacle lens 12 with the essentially conical aperture ray path SG.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Spectacle lens device comprising at least one electrically adaptive area, for electrically controlling optical properties of the spectacle lens device, the spectacle lens device being configured so that optical properties in a predetermined or predeterminable control area are electrically controllable essentially independently of optical properties in a surrounding area; wherein the control area and the surrounding area are sub-areas of the electrically adaptive area and do not have any common areas, further comprising an eye tracking device configured to find an eye's line of sight by detecting eye position and/or movement and to determine a visual point corresponding to an intersecting point of the line of sight with an eye-side surface of the electrically adaptive area, and the position of the control area being controllable so that the control area includes the visual point, and a control unit configured to control the control area so that in a standardized operating position of the spectacle lens device a projection of the control area on a surface of the vertex sphere has essentially an area ranging from about 10 mm² to 100 mm², where the vertex sphere is a sphere, a center point of which coincides with an eye's point of rotation and a radius of which is equal to the distance of the eye's point of rotation from the vertex in a standardized operating position of the spectacle lens device.

2. Spectacle lens device, as claimed in claim 1, wherein position, size and/or the optical properties of the control area are at least one of changeable and controllable time-wise.

3. Spectacle lens device, as claimed in claim 1, wherein the electrically adaptive area is disposed on at least one of an eye-side surface, on a lens-side surface and between the eye-side surface and the lens-side surface of the spectacle lens device.

4. Spectacle lens device, as claimed in claim 1, wherein the electrically adaptive area is configured substantially in a planar manner.

5. Spectacle lens device, as claimed in claim 1, wherein a geometric center point of the control area is located essentially at the position of the visual point.

6. Spectacle lens device, as claimed in claim 2, wherein at least one electrically conductive electrode is provided for controlling properties of the control area.

7. Spectacle lens device, as claimed in claim 1, wherein a spectacle lens has a plurality of electrically conductive electrodes.

8. Spectacle lens device, as claimed in claim 1, wherein the control area has essentially an area ranging from about 10 mm² to 100 mm².

9. Spectacle lens device as claimed in claim 1, wherein the control areas has an area ranging from about 35 mm² to 55 mm².

10. Spectacle lens device, as claimed in claim 1, wherein the range of the vertex sphere surface is from about 35 mm² to 55 mm².

11. Spectacle lens device, as claimed in claim 1, wherein the control area has diffractive properties.

12. Spectacle lens device, as claimed in claim 1, furthermore comprising a plurality of electrically adaptive element cells, wherein the control area has at least one of the electrically adaptive element cells.

13. Spectacle lens device, as claimed in claim 1, wherein the control area has a plurality of electrically adaptive element cells.

14. Spectacles comprising at least one spectacle lens device as claimed in claim 1.

15. Method of using at least one spectacle lens device as claimed in claim 1, in spectacles, comprising adjusting optical properties of the control area to match a spectacle wearer's individual data.

16. Method for operating an electrically adaptive area of a spectacle lens device, as claimed in claim 1, comprising controlling with the spectacle lens device the control area of the electrically adaptive element so that optical properties of the control area essentially match predefined values in a spectacle wearer's individual data.

17. Method of using the spectacle lens device as claimed in claim 7, wherein the optical properties of the control area are adjusted to match a spectacle wearer's individual data.

18. Method, as claimed in claim 16, further comprising detecting a line of sight with an eye tracking system; determining a visual point that is an intersecting point of the line of sight with the eye-side surface of the electrically adaptive area; and positioning the control area so that the control area essentially comprises the position of the visual point.

* * * * *